United States Patent [19]

Maury

[11] 4,383,207

[45] May 10, 1983

[54] APPARATUS AND METHOD FOR DISPLACING MOVABLE SYSTEM WITH RESPECT TO A DATA CARRIER

[75] Inventor: Christian Maury, Velizy, France

[73] Assignee: CII-Honeywell Bull, Paris, France

[21] Appl. No.: 186,294

[22] Filed: Sep. 11, 1980

[30] Foreign Application Priority Data

Sep. 21, 1979 [FR] France ................ 79 23579

[51] Int. Cl.³ ............ G05B 13/00; G05B 13/02; G05B 6/02
[52] U.S. Cl. .......................... 318/560; 318/561; 318/568
[58] Field of Search ............ 318/77, 78, 560, 561, 318/568

[56] References Cited

U.S. PATENT DOCUMENTS

| 3,554,980 | 12/1970 | Applequist et al. | 340/174.1 |
| 3,629,560 | 12/1971 | Slanson | 235/151.11 |
| 4,030,132 | 1/1977 | Iftikar et al. | 360/78 |
| 4,031,443 | 6/1977 | Droux et al. | 318/561 |
| 4,166,970 | 9/1979 | Cardot et al. | 318/561 |
| 4,200,827 | 4/1980 | Oswald et al. | 318/561 |

FOREIGN PATENT DOCUMENTS

| 2133 | 5/1979 | European Pat. Off. | 318/561 |
| 2094610 | 12/1970 | France . | |
| 2172733 | 9/1973 | France . | |
| 2258661 | 8/1975 | France . | |
| 2349191 | 1/1977 | France . | |
| 2336768 | 7/1977 | France . | |
| 2337472 | 7/1977 | France . | |
| 1485563 | 9/1977 | United Kingdom . | |

OTHER PUBLICATIONS

Hewlett-Packard Journal, vol. 23, 1972, pp. 6-11.
IBM Techical Disclosure Bulletin, vol. 9, pp. 1694-1695, and 1884.

Primary Examiner—J. V. Truhe
Assistant Examiner—A. Eyans
Attorney, Agent, or Firm—Lowe, King, Price & Becker

[57] ABSTRACT

A head is shifted relative to a magnetic disc for recorded information carried by plural concentric recording tracks on the disc. Addresses of the tracks are recorded on and read by a head from plural reference zones on the disc. The head is shifted from a starting track A to a destination track B by an electric motor. The motor is controlled so the head is accelerated from track A to track C and the head is decelerated when it reaches track C; track C being between tracks A and B. The motor is controlled by calculating an acceleration instruction for the head in response to addresses read by the head and by measuring the head acceleration. The instruction and measured accelerations are combined to derive an error indication that controls the motor.

23 Claims, 15 Drawing Figures

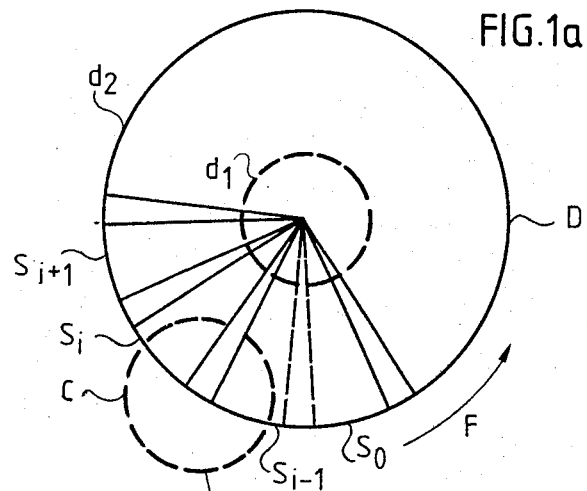
FIG. 1a
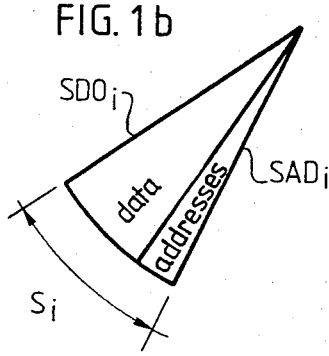
FIG. 1b
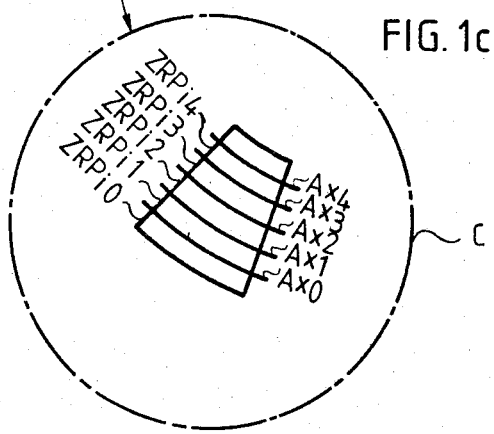
FIG. 1c
FIG. 1d
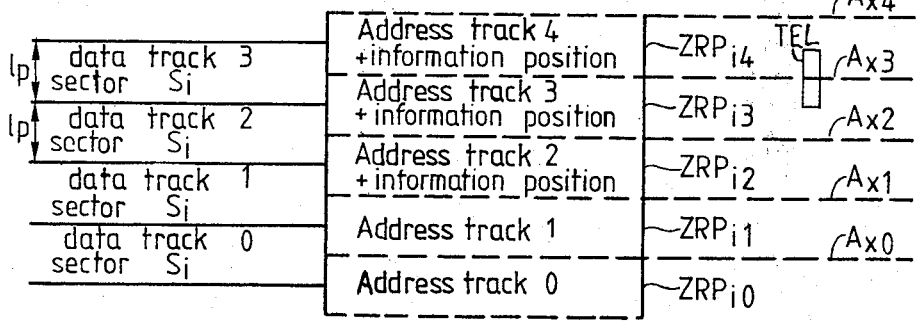
FIG. 1e
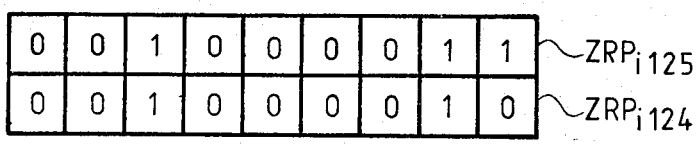

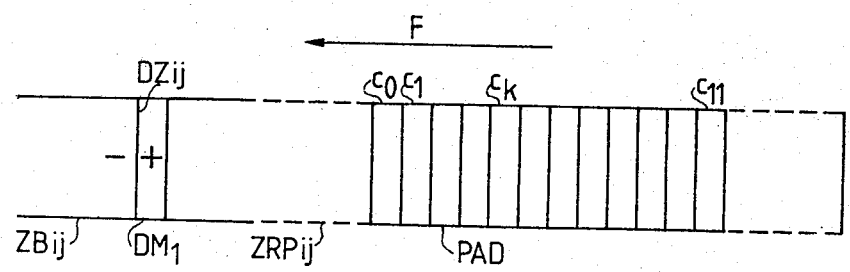
FIG.2a
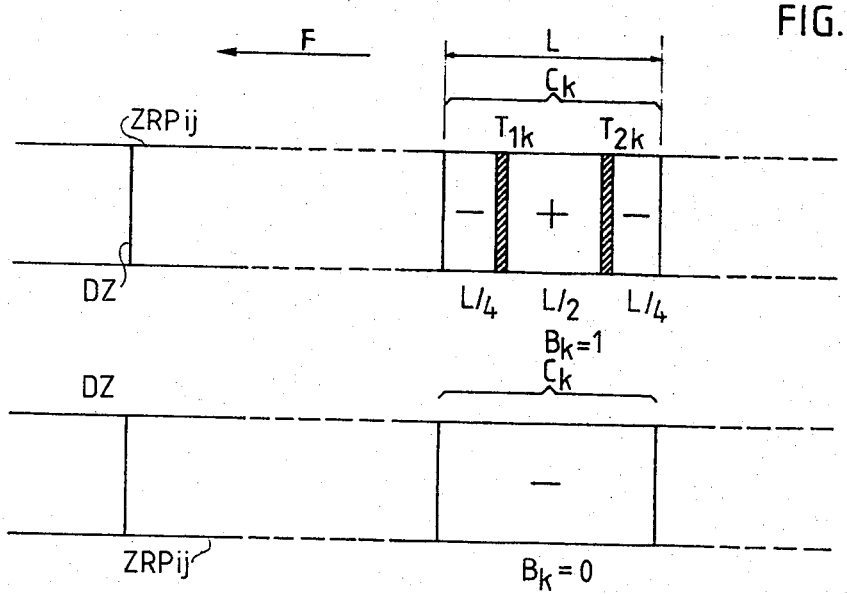
FIG.2b
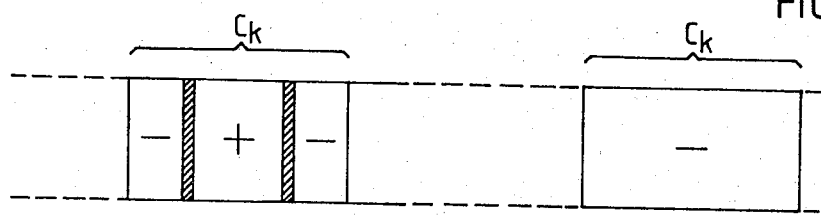
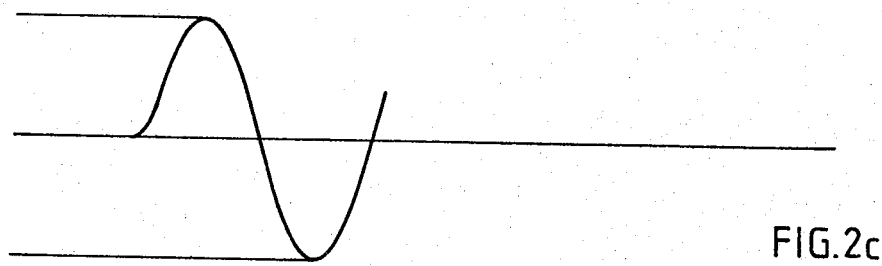
FIG.2c
FIG.2

APPARATUS AND METHOD FOR DISPLACING MOVABLE SYSTEM WITH RESPECT TO A DATA CARRIER

TECHNICAL FIELD

The present invention relates to apparatus for and a method of displacing a movable system with respect to a data carrier and, more particularly, to displacing a head for a data carrier in response to acceleration instructions derived from addresses read by the head from the carrier and a measured head acceleration value.

BACKGROUND ART

In data processing systems, magnetic disc memories are very frequently used because they have high storage capacity and require a relatively short time for magnetic read/write heads to access a data item contained at any point on a disc from the moment an order is derived to access the data item. Magnetic discs used in such memories carry coded data in concentric circular recording tracks having a width no greater than a few hundredths of a millimeter. The recording tracks are situated on both faces of the discs. Data recorded in the tracks are usually coded in binary form.

Each individual track on a disc is assigned a serial number $j$, where $j$ is an integer between zero and $(N-1)$, where N is the total number of recorded tracks on a face of a disc. A binary coded expression of a serial number $j$ for a particular track is referred to as the track address. Each track includes magnetic variations, representing binary values for the track addresses and for data recorded between the space provided for the addresses.

Data are read from or written into the tracks by magnetic heads that are positioned on each side of the discs, at a distance of a few tenths of a micron from the disc. To position the heads at a particular track address, the heads are driven radially relative to the disc, while the discs are driven at constant rotational speed by an electric motor.

In currently available magnetic disc memory systems, and, more particularly, in the case of disc memories including a limited number of discs, generally fewer than four or five, the data are arranged on the disc faces as follows. A large amount of space is reserved for data or information to be processed by the data processing system of which the memory is a part; for simplication, these data are referred to as "data to be processed". A relatively small amount of space is reserved for track addresses and for data used to control the position of the magnetic head or heads relative to the tracks. Hereafter, the track addresses and data for servo-controlling the position of the head are referred to as "track identifying data".

In the following discussion, for simplification, only one face of a disc is considered in combination with only one magnetic head. The magnetic head reads and-/or writes both the data to be processed and the track identifying data. It is to be understood, however, that the principles of the invention are applicable to a system including multiple discs, each having two faces.

It is the present practice, as described, for example, in U.S. Pat. No. 4,151,571, for the data contained on each face of a disc to be distributed over equal and adjacent circular sectors $S_0, S_1 \ldots S_i \ldots S_{n-1}$. Generally, a disc face is divided into several tens of sectors, most often forty to fifty. As the face of a magnetic disc passes in front of or beneath a magnetic head associated with it, sector $S_0$ is read by the head before sector $S_1$, the sector $S_1$ before the sector $S_2$, etcetera. Thus, the nomenclature is that sector $S_0$ precedes sector $S_1$, which in turn precedes sector $S_2$, etcetera. Thus, if two data items $I_{k-1}$ and $I_k$ follow one another on the same track, having serial number $j$ on the same face, data item $I_{k-1}$ precedes data item $I_k$ because data item $I_{k-1}$ is read by the head before data item $I_k$; conversely, data item $I_k$ is said to follow data item $I_{k-1}$. The same reasoning is applicable for several data groups $G_k$ and $G_{k-1}$.

Each sector $S_i$ is divided into a relatively large area and a relatively small area. The large area of each sector $S_i$ includes the data to be processed, while the smaller area includes the track identification data. The smaller area of each sector is divided into several zones, referred to as "reference zones"; the number of reference zones on each disc is equal to the number of tracks on the disc, such that each track is associated with one and the same zone.

Binary ones and zeros are designated as "bits". Binary bits can be represented as magnetic variations in a track or as analog or binary electric signals. Binary or logic signals are capable of assuming only one of two values, while an analog signal is defined as a signal that can vary continuously between two positive and/or negative limit values. For simplification, any data item contained on a magnetic disc is designated in the present specification and claims as a bit. In particular, data items for identifying tracks are referred to as "track reference bits", while data items to be processed are referred to as "processed data bits".

To minimize the time required by the magnetic head to access any item of data to be processed, it is necessary for the head to move from one track to another in the shortest possible time. It is also necessary for the head to be positioned precisely with respect to the track. One type of system having a relatively short accessing time employs a voice coil type, electro-dynamic motor which is operated in a "bang-bang" mode of operation. The voice coil motor includes a coil that is linearly displaced within a cylindrically shaped permanent magnet. The coil is mechanically connected by a suspension arm to a carriage for the magnetic head. The magnetic head is driven through an acceleration phase, followed by a deceleration phase, whereby the head is displaced and accurately positioned at a desired track. During the acceleration phase, a constant current of one polarity is applied to the voice coil. The constant current causes the speed of the carriage and of the heads to increase as a linear function of displacement time. Because of the linear increase in speed of the carriage and head, the position of the carriage and head, as a function of time, is represented as an ascending arc of a parabola.

During the deceleration phase, a constant current of the opposite polarity is applied to the voice coil. The speed of the carriage therefore decreases as a linear function of time, while the position of the carriage and head, as a function of time, is represented as a descending arc of a parabola. Upon the completion of the deceleration phase, the carriage speed and the distance which remains for it to traverse to the desired location on the track should be sufficiently small for the head to be stopped above the selected track. A preferred configuration for traversing the heads in the described manner is disclosed in commonly assigned, U.S. Pat. No. 4,166,970.

In the apparatus and method disclosed in U.S. Pat. No. 4,166,970, the address of a track is the only data controlling the magnitude of the current supplied to the voice coil which drives the read/write head. The read/write head is displaced from an initial track A to a desired track B, the addresses of which are derived by a circuit for controlling addresses of the disc associated with the particular head. During the acceleration phase, the motor is supplied by a constant current as the head traverses from track A to track C, between tracks A and B. When the head arrives at track C, the current is reversed and the deceleration phase occurs.

In the method of U.S. Pat. No. 4,166,970, the track addresses are recorded on the discs in reflected binary, i.e., Gray, code. The address of track C is calculated as a function of the addresses of tracks A and B, with all three addresses being expressed in weighted binary or standard code. As the magnetic head is displaced, it reads track addresses which are stored and converted into weighted binary code. During the acceleration phase, the converted addresses are compared with the calculated address of track C. In response to track address C being read by the magnetic head, the deceleration phase is entered. The deceleration phase subsists until the speed of the head and carriage, i.e., movable system, is less than a minimum threshold $V_0$, as calculated from the read and converted addresses. In response to the speed of the movable system being less than the minimum threshold $V_0$, addresses of the tracks read by the magnetic head are read and compared with track address B. In response to the read track address being equal to track address B, the movable system is immobilized. A new displacement takes place if the read address differs from the address of track B.

The prior art system disclosed in U.S. Pat. No. 4,166,970 performs both the acceleration and deceleration phases in an open loop manner, i.e., without servo-control. Because of the open loop manner of operation, certain disadvantages occur. In particular, the distance which the head must travel from the moment when the head speed has dropped below the threshold $V_0$ is quite variable, even in situations wherein the same starting track A and the same final track B are involved. The variable travel distance is due to various internal and external parameters. Exemplary of the internal parameters are displacement direction, temperature, motor characteristics, such as coil inductance and resistance, and force coefficient, while exemplary of the external parameters are dry and viscous friction, effects of weight due to the relatively large disc memory inclination, and external vibrations. It has been found that the variable distance which must be traveled by the head after the head speed has dropped below the threshold $V_0$ necessitates several successive operations to reach the desired, final track B. Thereby, the time required by the head to access the data to be processed is relatively long. A second disadvantage which has been found through experimentation is that the prior art method does not function properly if there is a small separation between the starting track A and the final track B. In one particular situation, it was found that if the separation between the starting and final tracks was less than six, the method would not function properly. A further disadvantage is that is is difficult of obtain short access times with the prior art method.

It is, accordingly, an object of the present invention to provide a new and improved method of and apparatus for displacing a movable system with respect to a data carrier.

Another object of the present invention is to provide a new and improved apparatus for and method of controlling the movement of a magnetic read/write head of a magnetic disc memory system so that the head is very accurately and quickly driven from a starting track A to a desired final track B.

Another object of the present invention is to provide a new and improved apparatus for and method of driving a magnetic read/write head between track A and track B of a magnetic disc wherein internal and external parameters tending to increase the time required to drive the head between the tracks are circumvented.

A further object of the present invention is to provide a new and improved system for and method of driving a magnetic read/write head starting track A and a desired final track B of a magnetic disc wherein the same method and apparatus can be utilized for closely spaced and relatively distant tracks.

The Invention

In accordance with the present invention, the prior art system is modified to circumvent the above mentioned disadvantages by providing a servo-control system responsive to acceleration of the movable system including the magnetic head. The servo-control system involves calculating at predetermined sampling instants an acceleration instruction function $\gamma_c$ of the track address over which the head is located. The calculated acceleration instruction function $\gamma_c$ is considered as the acceleration instruction function $\gamma_c$ for the movable system including the head and carriage. The calculated value of $\gamma_c$ is compared with a measured value $\tilde{\gamma}$ for the system acceleration. In response to the aforesaid comparison between the values of $\gamma_c$ and $\tilde{\gamma}$, a voltage is derived and applied to the terminals of the voice coil which displaces the head and arm.

The servo or feedback system of the present invention provides a significant reduction in the time required for the read/write head to access any data item recorded on the face of a disc, compared to the apparatus and method disclosed in U.S. Pat. No. 4,166,970. A further advantage of the present invention over the prior art is that the read/write head is driven to the final track B in a single movement, without several successive movements, as has been found frequently to be the case with the prior art.

In a more specific aspect, the present invention involves displacing a movable system with respect to a data carrier on which are recorded a plurality of tracks having addresses written on the carrier in a plurality of reference zones. The number of reference zones is at least equal to the number of tracks, whereby each track is associated with at least one zone. The movable system is actuated by an electric motor which drives at least one data read head from a starting track A to an arrival or final track B, having an address designated as $AD_f$. As the head is traversed between tracks A and B, the addresses of the tracks are read by the head as addresses $ADL_j$.

In the invention, one acceleration instruction $\gamma_c$ is calculated as a function of address $ADL_j$ at predetermined sampling instants. At each of the predetermined sampling instants, the system acceleration $\tilde{\gamma}$ is measured. The values of $\gamma_c$ and $\tilde{\gamma}$ are compared for each sampling instant. In response to the comparison between $\gamma_c$ and $\tilde{\gamma}$, the motor is controlled.

In a preferred embodiment of the invention, the method and apparatus involve calculating the separation $\epsilon_1$, between the final track address and the track address where the head is located, as $\epsilon_1 = AD_f - ADL_j$. From the calculated value of $\epsilon_1$, a non-linear $f(\epsilon_1)$ is determined. The speed of the movable system is calculated as a function of the difference between the addresses read by the head at adjacent sampling instants. The acceleration instruction $\gamma_c$ is calculated as directly proportional to the sum of $(f(\epsilon_1) - v)$.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS:

FIGS. 1a-1e are topological diagrams including schematic illustrations of the manner in which data are arranged in a preferred embodiment of the present invention on a magnetic disc;

FIGS. 2a-2c are schematic diagrams indicating the manner in which data are recorded in cells in accordance with the invention and of a waveform derived from a head reading a cell;

Figure 3:
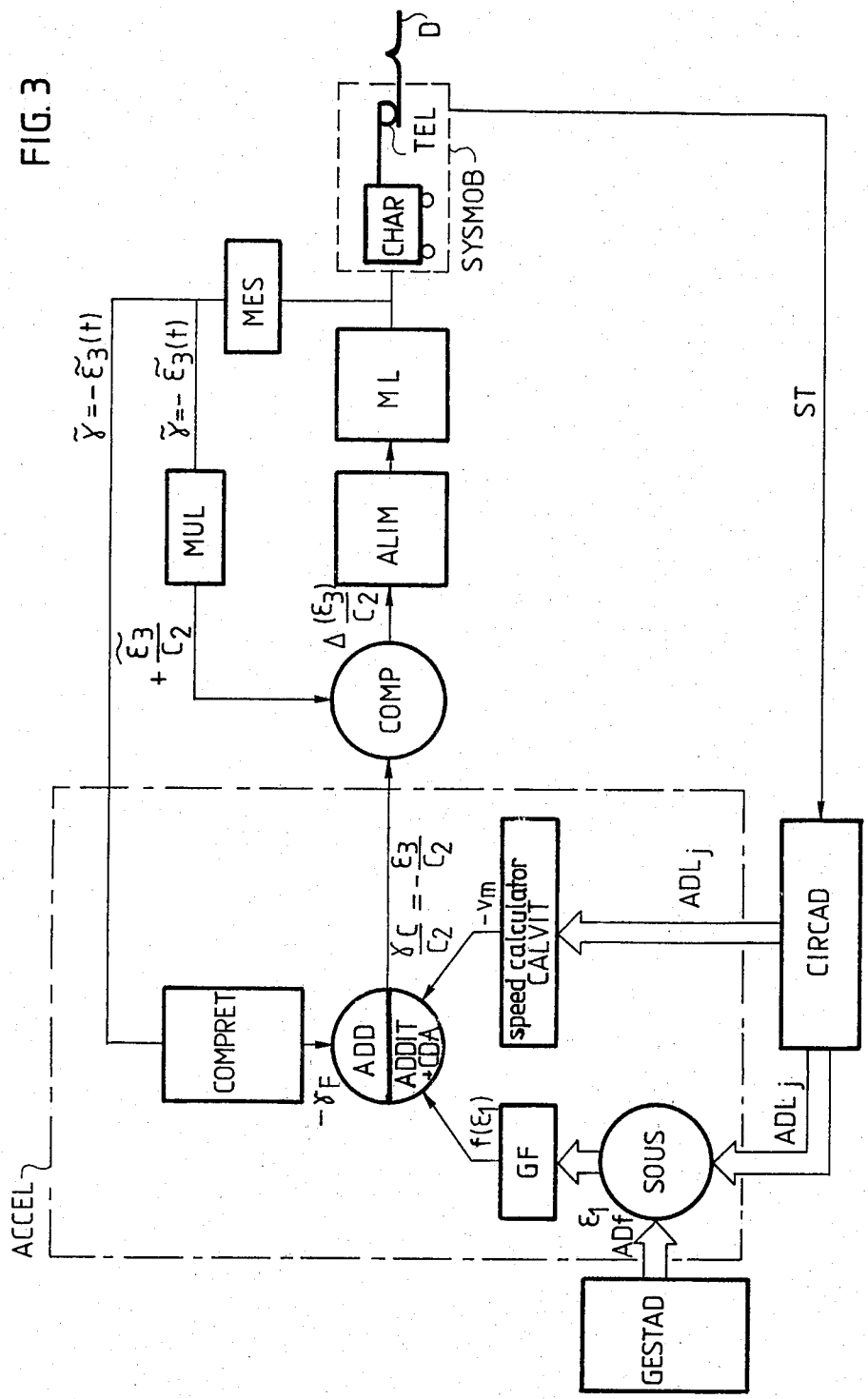
FIG. 3 is a block diagram of a device for displacing a movable system with respect to a magnetic disc data carrier, in accordance with the invention.

BEST MODE FOR CARRYING OUT THE INVENTION:

To provide a better understanding of the principles of the present device, relating to an apparatus for and method of displacing a movable system with respect to a recording carrier in the form of a magnetic disc, it is useful to review the manner in which data are recorded on a magnetic disc in the prior art. To this end, reference is made to FIGS. 1a-1e wherein the layout of the data is illustrated. A preferred manner of writing data within reference zones of the magnetic disc illustrated in FIGS. 1a-1e is indicated by the illustrations in FIGS. 2a-2c.

In FIG. 1a, a magnetic disc D is assumed to be turning about its center, in the direction of arrow F. Disc D includes a useful recording surface between concentric circles $d_1$ and $d_2$, from which data are read by a single magnetic read/write head TEL, FIG. 1d. On disc D there are defined $n_0$ equal and adjacent circular sectors $S_0, S_1 \ldots S_i \ldots S_{n0-1}$. Each sector $S_i$ is divided into a relatively large region $SDO_i$ and a relatively small region $SAD_i$, on which are respectively recorded the data to be processed and track addresses. As illustrated in FIGS. 1c and 1d, address segments $SAD_i$ of sectors $S_i$ are divided into N zones $ZRP_{i0} \ldots ZRP_{ij} \ldots ZRP_{i(N-1)}$, where N is the number of magnetic tracks on disc D. While only five zones $ZRP_{i0}$-$ZRP_{i4}$ are illustrated in FIGS. 1c and 1d for simplification, it is to be understood that there are several tens of zones on a particular disc. The boundaries between different zones $ZRP_{ij}$ are circular axes $Ax_j$ of adjacent magnetic recording tracks. Zone $ZRP_{ij}$ is associated with magnetic tracks having serial number j on axis $Ax_j$. Thus, reference zone $ZRP_{i0}$ is associated with the track having serial number 0, while reference zone $ZRP_{i1}$ is associated with the track having serial number 1, etcetera.

The magnetic read and/or write heads which cooperate with disc D include a magnetic circuit including a magnetic core on which is disposed a winding that extends across an air gap. To read and write the data to be processed from a track of serial number j of magnetic axis $Ax_j$, magnetic head TEL remains stationary with respect to the track while data are read from the track. It is necessary for the air gap to be perfectly centered on magnetic axis $Ax_j$, the boundary between reference zones $ZRP_{ij}$ and $ZRP_{i(j+1)}$. Thus, when disc D has been rotated so that head TEL is above a reference zone, the head straddles reference zones $ZRP_{ij}$ and $ZRP_{i(j+1)}$.

To simplify FIG. 1d, reference zones $ZRP_{ij}$ are represented as rectangles instead of arcuate regions. Each of reference zones $ZRP_{ij}$ contains the address of the track with which it is associated. Zone $ZRP_{i0}$ contains the address of the track having serial number 0, zone $ZRP_{i1}$ contains the address of the track having serial number 1, zone $ZRP_{i2}$ contains the address of the track having serial number 2, etcetera. The track addresses are written in reference zones $ZRP_{ij}$ in reflected binary code, frequently referred to as Gray code. The Gray code is well known and a description thereof appears, for example, in a book written by H. Soubies-Camy, published by *Editions Dunod*, 1961, pages 253 and 254. The Gray code for two successive addresses, those associated with tracks 124 and 125, are illustrated in FIG. 1e as 001000010 and 001000011, respectively. Thus, the Gray code for tracks 124 and 125 differ from each other by only one bit, namely the last bit, which is equal to zero for track 124 and equal to one for track 125.

Reference is now made to FIG. 2a wherein there are schematically illustrated individual cells forming a reference zone $ZRP_{ij}$ of a sector $S_i$. It is assumed that the disc containing the cells illustrated in FIG. 2a is moving from right to left relative to a magnetic head, as indicated by arrow F. As described in copending, commonly assigned, U.S. application, Ser. No. 076,332, filed Sept. 17, 1979, (Lowe, King, Price and Becker Docket 037-058), entitled "Method Of Writing Information On A Magnetic Recording Medium", the track address is contained in part PAD of zone $ZRP_{ij}$. The rest of zone $ZRP_{ij}$ principally contains data for servo-controlling the position of head TEL on axis $Ax_j$ of the track having serial number j. Reference zone $ZRP_{ij}$ is preceded by zone $ZB_{ij}$, referred to as a "wide zone" which separates the reference zone from segment $SDO_i$ of sector $S_i$, containing data to be processed. In zone $ZB_{ij}$, the magnetic induction is constant, for example, at a negative value, as indicated in FIG. 2a. In response to relative movement between zone $ZB_{ij}$ and head TEL, while the head is positioned above reference zone $ZRP_{ij}$, the head derives a zero output signal.

To record data on a magnetic disc, a succession of small magnetic barriers, having dimensions on the order of a few microns, referred to as "elementary areas" are created on each disc track. These areas are of variable length and are distributed over the entire track length and include alternate magnetic inductions of the same value, but of opposite polarity, in a direction parallel to the disc surface.

The start of reference zone $ZRP_{ij}$ is indicated by line $DZ_{ij}$, that defines a change in magnetic induction polarity between negative induction zone $ZB_{ij}$ and a positive magnetic induction area $DM_1$ of zone $ZRP_{ij}$. In the remainder of the specification and claims of the present application, a change in magnetic induction direction is refered to as a "magnetic transition".

A magnetic transition can be of two different types. A first type of magnetic transition occurs when the face of the magnetic disc travels beneath the magnetic head TEL, whereby the head is exposed to successive elementary magnetic areas of negative and positive induction; the corresponding magnetic transition is referred to as positive. A magnetic transition is defined as being negative if head TEL is exposed to successive elementary positive and negative induction areas.

Segment PAD of zone $ZRP_{ij}$, where the address of the zone is located, includes m identical elementary cells, each having an identical length L; in the embodiment illustrated in FIG. 2a, twelve such cells are illustrated and denominated as $C_0, C_1 \ldots C_k \ldots C_{11}$. Each cell of segment PAD contains one address bit. Any address $B_k$ contained in a cell is defined by the presence or absence of a double magnetic transition. The first magnetic transition $T_{1k}$ is of an opposite polarity to the second transition $T_{2k}$. For example, the first transition $T_{1k}$ is positive, while the second transition $T_{2k}$ is negative, as illustrated in FIG. 2b. The address bits $ADE_j$ of a track having serial number j of reference zone $ZRP_{ij}$ are coded, for example, such that bit $B_k$ is equal to a binary one, in the case of the presence of a double magnetic transition. If bit $B_k$ has a value equal to zero, the double magnetic transition is missing and there is a uniform magnetic induction across the length of the cell. For simplification, in the following description and claims, the absence and presence of a double magnetic transition are designated by the term "dibits".

In FIG. 2c are illustrated the analog signals derived by magnetic head TEL in response to cell $C_k$ having binary one and zero values. In response to cell $C_k$ having a binary one value, as indicated by the dibit on the left side, which includes two transitions, head TEL derives two analog pulses of opposite polarities and equal magnitudes, +AMP and −AMP, respectively. In response to the value of cell $C_k$ indicating a binary bit value of zero, as indicated by the right portion of FIG. 2b, head TEL derives a zero value, as indicated in the right portion of FIG. 2c.

Reference is now made to FIG. 3 of the drawing wherein there is illustrated a block diagram for performing the method of the invention wherein a movable system SYSMOB to be displaced includes magnetic read/write head TEL, mechanically coupled to carriage CHAR. The object of the apparatus illustrated in FIG. 3 is to displace, in a single motion, in the shortest possible time, magnetic read/write head TEL from a starting or initial track A to a final or arrival track B, having an address $AD_f$. The movement of head TEL is controlled by a non-linear second order differential equation of the type:

$$f(\epsilon_1) + d\epsilon_1/dt + 1 d^2\epsilon_1/C_2 dt^2 = 0 \quad (1)$$

where
$\epsilon_1$ and $f(\epsilon_1)$ are respectively the non-linear variable and function defined supra;
$f(\epsilon_1)$ is assumed to be an increasing function;
by definition, $\epsilon_2 = d\epsilon_1/dt = -v$, where v is the speed of head TEL; and
$\epsilon_3$ equals $$\epsilon_3 = d^2\epsilon_1/dt^2 = -\gamma,$$

where $\gamma$ is the acceleration of head TEL. By substitution, Equation (1) can be written:

$$f(\epsilon_1) + \epsilon_2 + \epsilon_3/C_2 = 0 \quad (1')$$

In a preferred embodiment of the invention, movable system SYSMOB is displaced with respect to the face of disc D by performing the following sequence of operations:

(1) at predetermined, equally spaced sampling instants spaced from each other by T seconds, an acceleration instruction $\gamma_c$ is calculated by:

(a) determining the address $ADL_j$ where head TEL is located and calculating the separation $\epsilon_1$;

(b) determining the corresponding function $f(\epsilon_1)$, a predetermined function of $\epsilon_1$, whereby $f(\epsilon_1)$ is also a function of address $ADL_j$;

(c) calculating the speed v of system SYSMOB as a function of the difference between addresses $ADL(nT+k_0T)$ and $ADL(nT)$, the addresses $ADL_j$ read by head TEL at sampling instants $t_n = nT$ and $t_{k0} = nT + k_0T$, where n and k are integers;

(d) calculating the acceleration instruction $\gamma_c$ such that $\gamma_c/C_2 = (f(\epsilon_1) - v)$, whereby $\gamma_c$ is a function of $ADL_j$;

(2) the acceleration $\tilde{\gamma}$ of system SYSMOB is measured and divided by the constant $C_2$;

(3) the difference $(\gamma_c - \gamma)/C_2 = \Delta(\gamma/C_2)$ is calculated;

(4) a coil of electro-dynamic motor ML is driven by a constant voltage having a polarity dependent upon the polarity of the calculated difference $\Delta(\gamma/C_2)$.

The apparatus of FIG. 3 for performing the stated method includes electro-dynamic motor ML having a voice coil which drives carriage CHAR of system SYSMOB. Motor ML is responsive to a network including circuit CIRCAD which determines the address $ADL_j$ read by head TEL from disc D. The address derived from circuit CIRCAD is combined with an address output signal for the final or desired address of head TEL, as derived from address control circuit GESTAD. The signals from circuits CIRCAD and GESTAD are combined in a calculating network ACCEL, which derives, by calculation, the acceleration instruction $\gamma_c$. Calculating network ACCEL is also responsive to an output signal of acceleration measuring device MES, which is coupled to motor ML, whereby the measuring device derives a signal representing the acceleration $\tilde{\gamma}$ of system SYSMOB. The output signal of measuring device MES is also divided by a predetermined constant $C_2$ in multiplier MUL, having an output signal which is supplied to one input of comparator COMP, having a second input responsive to the acceleration instruction signal $\gamma_c$ derived from calculating network ACCEL. Comparator COMP compares the acceleration instruction $\gamma_c$ with the measured acceleration $\tilde{\gamma}$, to derive an error signal which is coupled to voltage supply generator ALIM for the voice coil of electro-dynamic motor ML.

Figure 7:
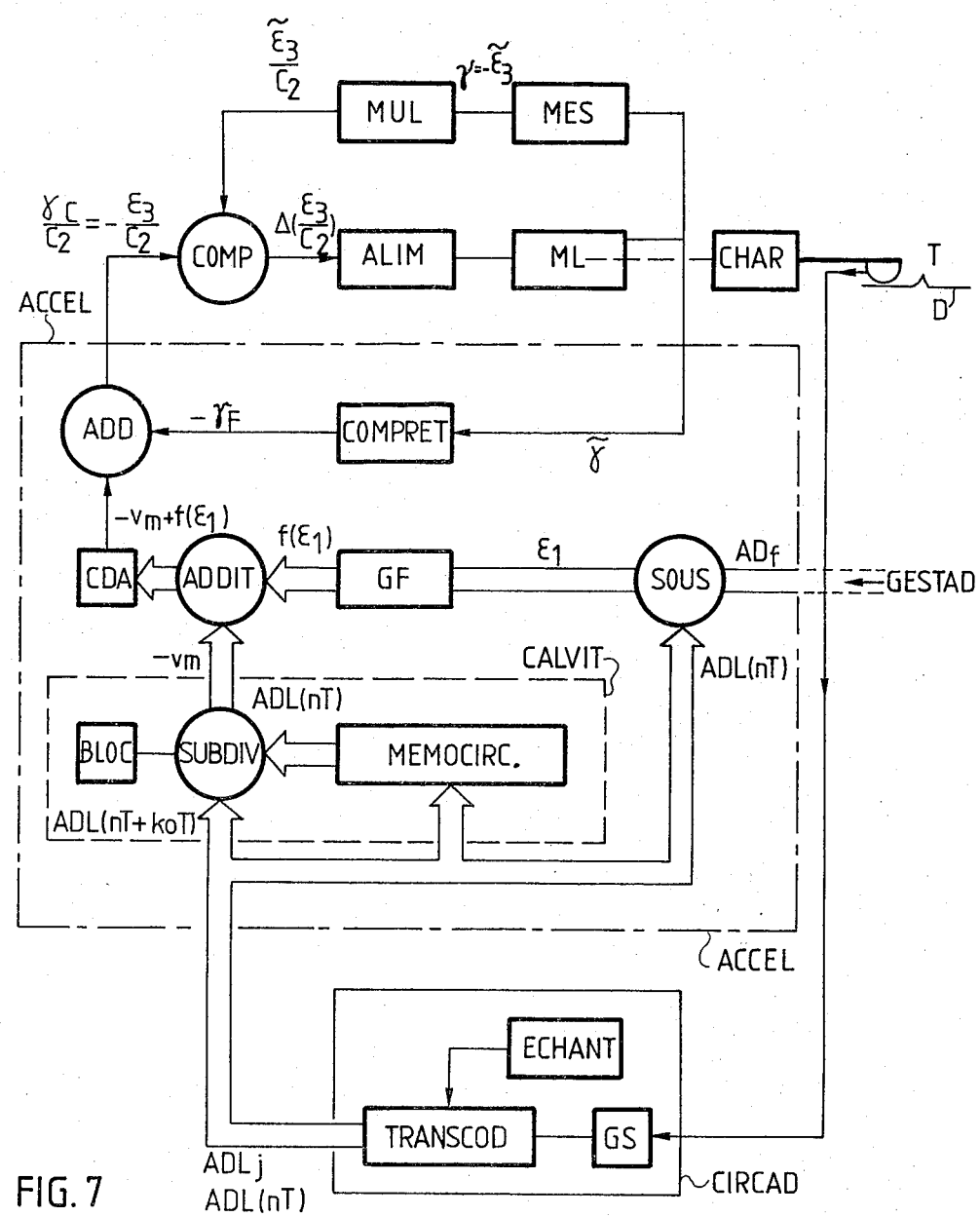
FIG. 7 is a more detailed block diagram of a displacement device in accordance with a preferred embodiment of the invention.

Circuit CIRCAD, illustrated in detail in FIG. 7, responds to an analog signal ST derived by magnetic read/wirte head TEL when the data dibits contained in segment PAD of zone $ZRP_{ij}$ are beneath head TEL. Signal ST is composed of a set of analog pulses, as indicated in FIG. 2c. Circuit CIRCAD responds to signal ST, to transform it into a set of logic pulses representative of the address $ADG_j$, in Gray code, of the serial number j of the track associated with reference zone $ZRP_{ij}$ which head TEL is over. Circuit CIRCAD converts the Gray code address $ADG_j$ into a weighted binary coded address $ADL_j$; weighted binary codes are described in the previously cited book by Soubies-Camy. Circuit CIRCAD derives the binary coded weighted address $ADL_j$ as a multibit, parallel signal that is supplied to calculation network ACCEL on a parallel bus. Address $ADL_j$ is supplied by circuit CIRCAD to calculating network ACCEL with a sampling frequency $F=1/T$, where T is a sampling period equal to the time required for disc D to travel between two segments PAD of two adjacent reference zones $ZRP_{ij}$ and $ZRP_{(i+1)j}$ associated with the same track having serial number j, whereby zone $ZRP_{ij}$ precedes zone $ZRP_{(i+1)j}$. In other words, addresses $ADL_j$ are supplied by circuit CIRCAD to calculating network ACCEL every T seconds.

Calculating network ACCEL, which calculates the acceleration instruction $\gamma_c$, is illustrated in FIGS. 3 and 7 as including a subtractor SOUS, which responds to the addresses $ADL_j$ and $ADF_j$, respectively derived from circuits CIRCAD and GESTAD. Subtractor SOUS responds to the output signals of circuits CIRCAD and GESTAD to derive an output signal proportional to the quantity $\epsilon_1 = ADF_f - ADL_j$. The output of subtractor SOUS is expressed in the same weighted binary code as address $ADL_j$ because the final address of track B, as derived from circuit GESTAD, is expressed in the same weighted binary code as address $ADL_j$. Subtractor SOUS calculates a new value of $\epsilon_1$ every T seconds in response to the new address $ADL_j$ being derived from circuit CIRCAD every T seconds.

The $\epsilon_1$ output signal of subtractor SOUS is supplied to function generator GF, which derives a binary output signal having a magnitude $f(\epsilon_1)$ every T seconds. Function generator GF derives the non-linear function $f(\epsilon_1)$ and supplies it to one input of binary adder ADDIT. The function $f(\epsilon_1)$ is a predetermined, known function, whereby the function generator can be in the form of a look-up table memory which derives the binary values of $f(\epsilon_1)$ in response to the values of $\epsilon_1$ derived from subtractor SOUS.

Figure 4:
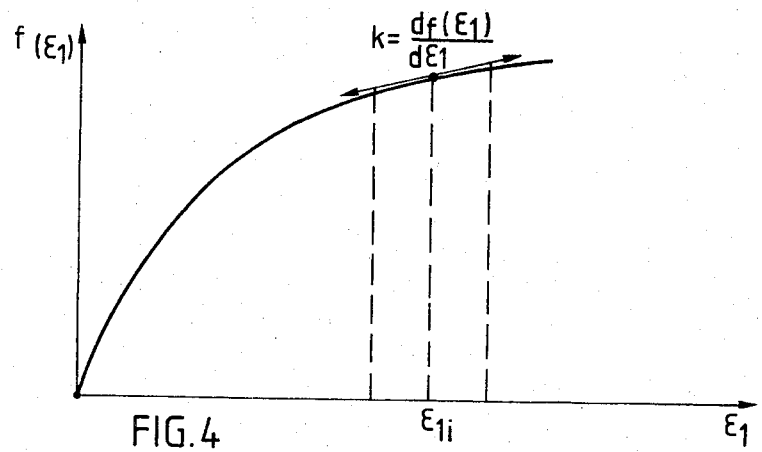
FIG. 4 is a curve of function $f(\epsilon_1)$ as a function of address separation $\epsilon_1$.

FIG. 4 includes a curve representing an exemplary non-linear output function $f(\epsilon_1)$ of function generator GF in response to a set of input values $\epsilon_1$. From FIG. 4, the slope of the function relating $\epsilon_1$ to $f(\epsilon_1)$ is relatively large for small values of $\epsilon_1$, and relatively small for large values of $\epsilon_1$, i.e., the derivative $df(\epsilon_1)/d\epsilon_1$ is relatively large for small values of $\epsilon_1$, but the derivative is small for large values of $\epsilon_1$. It is also noted that the values of $f(\epsilon_1)$ and $\epsilon_1$ are related to each other as a monotonic, approximately exponential, function.

Figure 8:
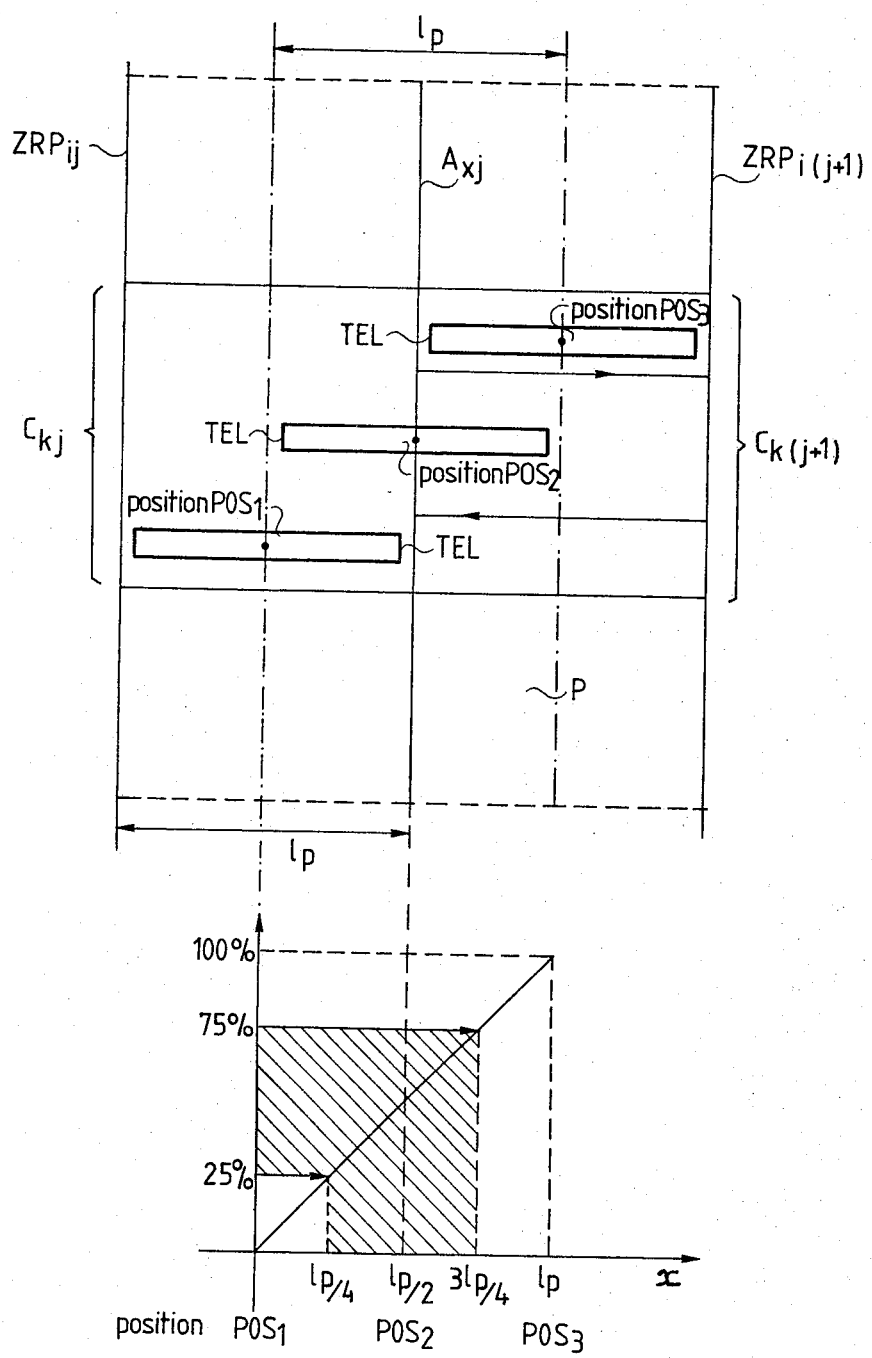
FIG. 8 is a schematic illustration of the accurate manner in which the address $ADL_j$ of a track having serial number j is determined.

Acceleration instruction calculating network ACCEL also includes a network CALVIT for deriving a binary signal representing the speed of head TEL relative to disc D. Network CALVIT responds every T seconds, i.e., once each sampling instant, to the multibit, parallel address $ADL_j$ output of circuit CIRCAD. Network CALVIT determines the speed $v_m$ of head TEL relative to disc D, in a radial direction, by calculating the number of addresses traversed by the head in a predetermined number of sampling intervals from the relationship: $ADL(nT+k_0T) - ADL(nT) = 1q$, where 1 is an integer and q is a distance equal to a fraction of the width of the tracks on disc D. Because all of the tracks of disc D have approximately the same width lp, as indicated in FIGS. 1d and 8, the value of $q = f \cdot lp$, where f is a constant between zero and one and q represents the accuracy with which an address is determined. In a preferred embodiment, q = one-half the width of a track, whereby q = 0.5 lp. Thereby, in the preferred embodiment, if head TEL reads an address $ADL_j$ from a track of serial number j, head TEL is disposed opposite the track of serial number j, at approximately half a track. The quantity 1q therefore represents the distance traveled by head TEL during a time interval $k_0 \cdot T$ seconds.

Calculating network CALVIT determines the speed of head TEL according to the formula $v_m = 1q/k_0T$. The calculated or measured speed value $v_m$ signal derived by network CALVIT is reversed in polarity and supplied in binary form to the other input of adder ADDIT.

As described in more detail infra, the measured speed $v_m$ derived from network CALVIT at time instant $(nT+k_0T)$ is not equal to the actual speed v of head TEL at the instant $(nT+k_0T)$. Instead, the output signal of network CALVIT at instant $(nT+k_0T)$ is indicative of the speed of head TEL at a previous time, designated as $(nT+k_0T) - \theta$, where $\theta = (k_0+1)T/2$; thereby, $\theta$ is referred to as an average estimation delay.

Because of the delay in the calculated speed signal derived from network CALVIT, the acceleration instruction calculation network ACCEL includes a compensation network COMPRET, which compensates for the average estimation delay $\theta$ of measured speed $v_m$ with respect to the actual speed v of head TEL. Network COMPRET responds to signal $\tilde{\gamma}$ as derived from measuring device MES to derive compensation signal $\gamma_F$ that is supplied to one input of adder ADD, having a second input responsive to the combined outputs of function generator GF and network CALVIT. For simplification, adder ADD and adder ADDIT are shown as a single block in FIG. 3.

Network COMPRET is preferably an analog, low-pass filter network responsive to the analog output signal of measuring device MES. Network COMPRET derives an analog output signal $\gamma_F$ such that compensation is provided for the delay inherent in the operation of binary network CALVIT. That such compensation occurs can be seen by designating the quantity $(V_m + \gamma_F) = \tilde{v}$, the estimated speed of head TEL. Thus, the magnitude of the output signals of networks COMPRET and CALVIT is the estimated speed. The speed difference $\Delta v$ is defined as $v - \tilde{v} = v - v_m - \gamma_F$. The characteristics of low-pass filter network COMPRET are established so that the speed difference $\Delta v$ is a minimum, i.e., approximately zero. Thus, the estimated speed $\tilde{v}$ is practically equal to the actual speed v of head TEL. It can be shown that this result is obtained for a value of $\gamma_F = \gamma \cdot G$, where G is the transfer function of low-pass filter COMPRET.

The analog output signal of compensating network COMPRET is reversed in polarity and supplied, in analog form, to analog adder ADD. Analog adder ADD is also responsive to an analog signal representing the amplitude and polarity of the binary signal derived from binary adder ADDIT. To this end, the binary output of adder ADDIT, having a polarity and magnitude representative of $f(\epsilon_1) - v_m$ is supplied to a digital to analog converter CDA. Adder ADD thus derives an analog signal having a magnitude and polarity in accordance with $f(\epsilon_1) - v_m - \gamma_F$. The output of analog adder ADD is thereby a relatively constant signal representing the acceleration instruction $\gamma_c$. In effect, the output of adder ADD can be represented as:

$$-v_m + f(\epsilon_1) - \gamma_F = -(v_m + \gamma_F) + f(\epsilon_1) = f(\epsilon_1) - v = f(\epsilon_1) + \epsilon_2 = -\epsilon_3/C_2 = \gamma_c C_2.$$

The output signal of adder ADD, having a magnitude represented by $\gamma_c/C_2 = -\epsilon_3/C_2$ is supplied to one input of analog comparator COMP, having a second input, in the form of an analog signal having a magnitude and polarity represented by $\tilde{\epsilon}_3/C_2$, as derived from analog multiplier MUL.

Multiplier MUL responds to an analog output signal of measuring device MES, having a magnitude and polarity represented by $\tilde{\gamma} = -\epsilon_3(t)$, where t is an instantaneous time value. Acceleration measuring device MES derives an analog signal $\tilde{\gamma}$ by relying upon the principle that the acceleration of movable system SYSMOB is proportional to the current supplied to the voice coil of electro-dynamic motor ML. Thus, the acceleration of system SYSMOB can be determined by measuring the current supplied to the voice coil of motor ML and multiplying a signal proportional to the measured current by a proportionality constant to obtain the signal $\tilde{\gamma}$. Thus, measuring device MES monitors the current supplied to the coil of motor ML and derives a suitable analog signal indicative of the monitored current. For diagrammatic purposes, the measuring device is shown as being connected to the output of motor ML, but it is to be understood that in actuality it is responsive to the current supplied to the coil of the motor. The analog signal derived from measuring device MES is supplied in parallel to compensation network COMPRET and to multiplier MUL, where it is scaled or multiplied by the factor $1/C_2$, and then supplied to comparator COMP.

The output of comparator COMP is an analog signal having a magnitude and polarity representative of an error between the measured and instructed values of acceleration of system SYSMOB. To this end, the magnitude and polarity of the analog output signal of comparator COMP is represented as $(\gamma_c - \tilde{\gamma})/C_2 = (\tilde{\epsilon}_3 - \epsilon_3)/C_2 = \Delta(\epsilon_3/C_2)$. The analog output error signal of comparator COMP is coupled, as a control input, to voltage supply generator ALIM. In response to $\Delta(\epsilon_3/C_2)$ being positive and negative, supply generator ALIM respectively supplied voltages $+U$ and $-U$ to the coil of linear electro-dynamic motor ML. It is to be understood that in a preferred embodiment, adder ADD and comparator COMP are a single element, but that they are shown as separate elements for the purposes of clarity. Thus, adder ADD and comparator COMP can, together, be considered as a single means for combining signals representative of $f(\epsilon_1)$, $v_m$, $\gamma_F$, and $\tilde{\epsilon}_3/C_2$ to derive the analog error signal $\Delta(\epsilon_3/C_2)$.

Figure 5:
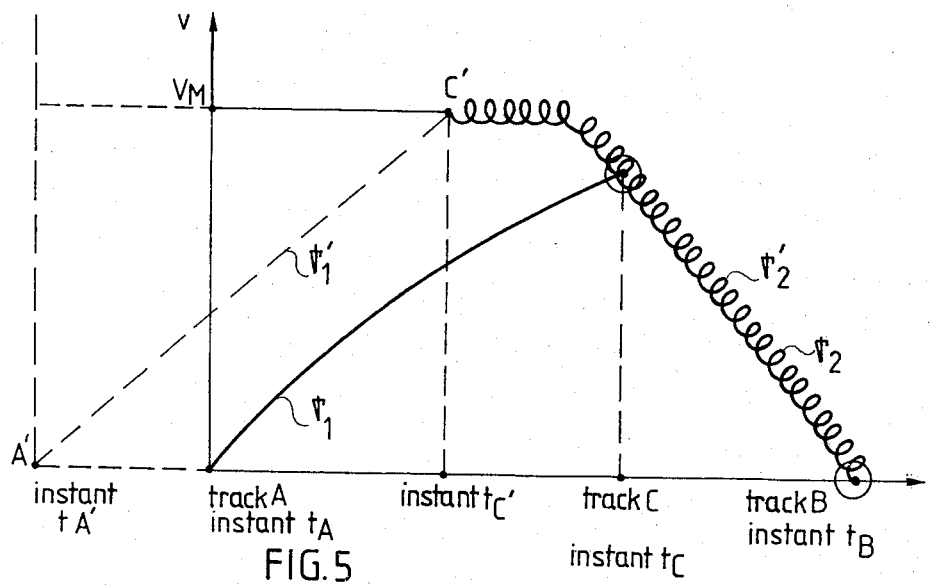
FIG. 5 is a curve of the manner in which the speed of the movable system varies as a function of time.
Figure 6:
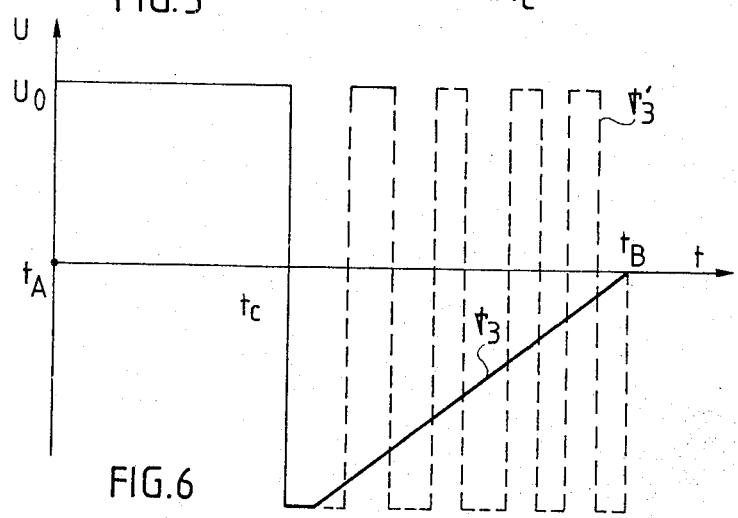
FIG. 6 is a curve of supply voltage for a voice coil for the movable system, as a function of time.

Reference is now made to FIG. 5 of the drawing wherein the speed of movable system SYSMOB is plotted as a function of time while traversing between tracks A and B. Between track A and an intermediate track C, the coil of motor ML is permanently supplied with a positive voltage $+U_0$ in response to the output of generator ALIM, since the error signal $\Delta(\epsilon_3/C_2)$ derived by comparator ADCOMP is positive throughout the interval. The positive voltage supplied by generator ALIM to motor ML between time $t_A$ and $t_C$ is also shown by the waveform of FIG. 6 as having a constant value $+U_0$. As illustrated in FIG. 5, between tracks A and B during the intervals between times $t_A$ and $t_B$, head speed v, as represented by the curve $r_1$, is approximately of exponential form, with the head speed remaining less than speed $v_m$. For sufficiently large values of $\epsilon_1$, it is estimated that at each abscissa point, such as abscissa point $\epsilon_{1i}$ (FIG. 4), $f(\epsilon_1)$ has a relatively small value, represented by:

$$f(\epsilon_1) = a + \alpha \epsilon_1, \quad (2)$$

where $\alpha = df(\epsilon_1)/d\epsilon_1$, and $\alpha$ is a very small value. The movement of movable system SYSMOB is controlled by a differential equation of the form $$\epsilon_2 + 1/C_2 \cdot d\epsilon_2/dt = \text{constant}. \quad (3)$$

The solution of Equation (3) is of the type $$\epsilon_2 = B_1(1 - e^{-C_2 t}) \quad (4)$$

where $B_1$ is a constant. Thereby, between tracks A and C, the movement of system SYSMOB is speed regulated.

As head TEL approaches track B, where there are smaller deviations of address $\epsilon_1$ and the value of the error signal $\Delta(\epsilon_3/C_2)$ is changing polarity, the approximation given by Equation (2) is no longer valid. Thereby, the movement of system SYSMOB is defined by the nonlinear second order differential Equation (1), supra. Because of the changing polarity of error signal $\Delta(\epsilon_3/C_2)$, the output of ALIM varies between $+U_0$ and $-U_0$. Therefore, after track C has been passed, i.e., after time $t_C$, the speed versus time curve of system SYSMOB is represented by curve $r_2$. The trajectory of curve $r_2$ corresponds to the non-linear second order differential Equation (1) and is approximated as a cylindrical helix having an axis extending along approximately a straight line between times $t_C$ and $t_B$, i.e., in the interval between the intermediate and final track positions.

In FIG. 5 is also shown a curve of the speed v of system SYSMOB as a function of time for a situation where the starting address A' is removed by a greater extent from the starting address than for the situation indicated by curve $r_1$. Such a situation is indicated by curves $r'_1$ and $r'_2$. Curve $r'_1$ indicates the speed versus time trajectory of system SYSMOB between pount A' and intermediate point C' for the modified situation, while curve $r'_2$ represents the trajectory between tracks C' and B. During the deceleration interval, between time $t_{C'}$ and time $t_B$ for this situation, the voltage supplied by generator ALIM to motor ML constitutes a set of constant amplitude pulses of alternate polarity in response to the polarity reversals of error signal $\Delta(\epsilon_3/C_2)$. The duration of successive pulses derived from circuit ALIM has a tendency to decrease over the interval between times $t_{C'}$ and $t_B$ so that the average voltage during this interval has a negative value, with a positive slope. The last two pulses in the interval, i.e., immediately before track B is reached, have the same duration, but opposite amplitude, whereby the voltage supplied by circuit ALIM to motor ML is zero at time $t_B$, as illustrated in FIG. 6. It is to be understood that the waveform of FIG. 6 is reversed for a reversal in the relative amplitudes of the initial and final track addresses.

Reference is now made to FIG. 7 of the drawing wherein the details of circuit CIRCAD are illustrated as including threshold circuit GS responsive to the analog output signal of head TEL. Threshold circuit GS derives a serial binary signal that is supplied to converter register TRANSCOD, also responsive to sampling pulses derived from sample generator ECHANT, which pulses are derived every T seconds, which defines the sampling times.

Threshold circuit GS responds to output signal ST of head TEL to transform the analog pulses in signal ST into a set of logic pulses. To this end, threshold circuit GS includes a pair of thresholds $S_1$ and $S_2$ which are a function of the absolute value of the average amplitude of the signals derived by head TEL for binary one bits in the interval under consideration.

It will be recalled, by reference to FIG. 2, that a binary one is represented at the output of head TEL by two opposite polarity pulses, while a binary zero is represented at the head output as a zero amplitude. The thresholds $S_1$ and $S_2$ are respectively set to 0.25 AMP and 0.75 AMP, where AMP is equal to the average absolute magnitude of the amplitude of each pulse derived for a binary one bit from head TEL.

Circuit GS determines the value of bits derived by head TEL while the head is in the reference zone by comparing the output signal of the head with the set threshold values. Because addresses are written in the reference zones in Gray code, a head TEL that perfectly straddles a pair of reference zones derives, for corresponding cells of adjacent track addresses, one of three values, namely a zero level, a maximum level, approximately AMP, and an intermediate level, approximately 0.5 AMP. For any particular pair of adjacent track addresses being read by head TEL, only one cell can be associated with signals of approximately 0.5 AMP; all of the remaining voltages derived from the head, for a particular pair of adjacent reference zones, must be approximately zero or approximately AMP. The approximately zero and approximately AMP values read from head TEL respectively occur for cells having zero and one values; thus, in FIG. 1e, voltages of zero or AMP are derived from all of the cells, except for the last cell. For correspondingly numbered cells of adjacent reference zones that differ from each other, the output of head TEL is approximately 0.5 AMP. This is the situation of the binary one and binary zero values for the last cells of zones $ZRP_{124}$ and $ZRP_{125}$, FIG. 1e.

If corresponding bits $B_{kj}$ and $B_{k(j+1)}$ of adjacent reference zones are both zero, the output signal ST of head TEL is zero, and therefore less than the threshold $S_1$. Circuit GS thus derives a binary zero output signal. The binary output signal is derived from circuit GS even if head TEL is not positioned so it exactly straddles axis $Ax_j$, between adjacent reference zones $ZRP_{ij}$ and $ZRP_{i(j+1)}$, so long as the edges of the head are positioned anywhere between boundaries $Ax_{(j-1)}$ and $Ax_{(j+1)}$.

If corresponding cells in the addresses of reference zones $ZRP_{ij}$ and $ZRP_{(j+1)}$ both have a binary bit value on one, the output voltage of head TEL has a positive amplitude, followed by a negative amplitude. The positive and negative amplitudes have absolute values equal to AMP, which is greater than $S_2$. Circuit GS responds to the positive and negative amplitude pulses and the magnitude of ST to derive a binary one value as long as the edges of head TEL are positioned between axes $Ax_{(j-1)}$ and $Ax_{(j+1)}$.

If it is assumed that corresponding cells of the address of zones $ZRP_{ij}$ and $ZRP_{(j+1)}$ are respectively equal to one and zero, as occurs for one bit of a pair of adjacent reference zones, an ambiguity bit is detected by detector GS. The absolute value of the signal derived for an ambiguity bit can vary continuously from zero to one hundred percent of AMP, depending upon the position of head TEL relative to axis $Ax_j$, as long as the edges of head TEL are confined between axes $Ax_{(j-1)}$ and $Ax_{(j+1)}$. In the extreme left position illustrated in FIG. 8, the center of head TEL is at position $POS_1$, midway between axes $Ax_{(j-1)}$ and $Ax_j$. In the intermediate position illustrated in FIG. 8, head TEL is located so that the center thereof is at position $POS_2$, on axis $Ax_j$. Head TEL may also be at the extreme right position illustrated in FIG. 8, whereby the center of the head is coincident with position $POS_3$, which is halfway between axes $Ax_j$ and $Ax_{(j+1)}$. The distance between positions $POS_1$ and $POS_3$ is equal to the width of a zone $ZRP_{ij}$, which in turn is equal to the width lp of a track. The distance lp is also referred to as the pitch between tracks.

The amplitude of the signal derived from head TEL is dependent upon the location of the center of the head relative to positions $POS_1$ and $POS_3$. Let x represent the position of the center of head TEL, such that $x=0$ when the center of head TEL is at position $POS_1$ and $x=1$ when the center of head TEL is at position $POS_3$. The amplitude of the ambiguity bit is thus a function of x and is represented as $A(x)$. Considering the situation of the two least significant bits in the addresses of FIG. 1e, wherein cell $C_{kj}$ has a value of zero and cell $C_{k(j+1)}$ has a value of one, it is seen that if x is less than lp/4, $A(x)$ is less than the threshold $S_1$, equal to 0.25 AMP. On the other hand, if x is greater than 3 lp/4, $A(x)$ is greater than the maximum threshold, equal to 0.75 AMP. If x is between lp/4 and 3 lp/4, $A(x)$ is between the maximum and minimum thresholds $S_1$ and $S_2$, i.e., between 0.25 AMP and 0.75 AMP.

For the ambiguity situation, if one pulse for a particular address cell has an amplitude greater than upper threshold $S_2$, the other pulse has an amplitude less than $S_1$. Detector GS responds to a pair of such pulses for a single cell, as well as to pulses between the thresholds $S_1$ and $S_2$, to derive binary values for the ambiguity bit such that if the amplitude of the two pulses is between the two thresholds, a binary weighted value $a_{-1}(j)$ value of one is derived. If, however, the value of one pulse is less than the lower threshold and the value of the other pulse within a cell is above the upper threshold, the binary weighted value $a_{-1}(j)$ is assumed to be zero.

The pulses supplied by detector GS are supplied to converter TRANSCOD, which responds to the Gray coding of the pulses to derive address $ADG_j$ or $ADG_{j+1}$. Converter TRANSCOD responds to the output of threshold circuit GS at a frequency of 1/T, equal to the frequency of the sampling pulses derived by a timing source (not shown) and supplied to sampling generator ECHANT. Converter TRANSCOD responds to the Gray coded pulses derived from detector GS to derive a weighted or standard binary coded signal. Converter register TRANSCOD therefore derives every T seconds, on a parallel output bus, the address $ADL_j$ in weighted binary code and supplies this signal to acceleration coefficient calculating network ACCEL. The output signal of converter register TRANSCOD responds to successive binary outputs of detector GS to derive address $ADL_{ji}$, such that $$ADL_j = a_{-1}(j) \cdot 2^{-1} + a_0(j)2^0 + a_1(j)2^1 \ldots a_n(j)2^n, \quad (5)$$

where
$a_1(j), a_2(j) \ldots a_n(j) \epsilon \{0, 1\}$
weight $2^{-1} = lp/2$.

From the foregoing, any position whatsoever of head TEL opposite the face of the disc with which it is associated can be represented by an address quantified as a half-step, i.e., half track width. Thus if it is assumed that serial number j equals 124 and x is less than lp/4, i.e., A(x) is less than $S_1$, head TEL occupies track 124. If, on the other hand, x is greater than 3 lp/4, whereby A(x) is greater than $S_2$, head TEL is located above track 125. If the value of x is between the thresholds $S_1$ and $S_2$, it is assumed that head TEL is above track 124.

If it is assumed that the final position of head TEL is such that the head is positioned directly on magnetic axis $Ax_f$ of address $AD_f$, $$AD_f = 1.2^{-1} + a_0(f)2^0 + \ldots a_n(f)2^n \quad (6)$$

where $a_0(f), a_1(f) \ldots a_n(f)$ belong to $\{0, 1\}$.

The separation $\epsilon_1 = AD_f - ADL_j$, expressed as a half-step, can be calculated in binary form as:

$$\epsilon_1 = \epsilon_{1-1}(j) \cdot 2^{-1} + \epsilon_{10}(j) \cdot 2^0 + \epsilon_{11}(j)2^1 \ldots \epsilon_{1n}(j)2^n \quad (7)$$

where $\epsilon_{1i}(j) \{0, 1\}$.

The accuracy with which the position of head TEL can be determined and of the separation $\epsilon_1$ equals $lp/2 = q$.

Network CALVIT for calculating the speed of head TEL, $v_m$, includes, as illustrated in FIG. 7, a circulating memory MEMOCIRC, a binary subtractor-divider SUBDIV, and an inhibiting device BLOC. Circulating memory MEMOCIRC is supplied every T seconds with address $ADL(nT+k_0T)$ and supplies the address $ADL(nT)$ to subtractor-divider SUBDIV. Subtractor-divider SUBDIV is also responsive to the address $ADL(nT+k_0T)$. Circulating memory MEMOCIRC retains all of the values of addresses read between times (nT) and $(nT+k_0T)$. Thus, all of the addresses $ADL(nT), ADL(nT+2T) \ldots ADL(nT+k_0T)$ are serially stored in memory MEMOCIRC as they are read. Subtractor-divider SUBDIV calculates the speed value $v_m$ by determining the difference $ADL(nT+k_0T) - ADL(nT)$ and by dividing the difference by the quantity $k_0T$. Subtractor-divider SUBDIV performs these operations once each sampling interval, i.e., every T seconds. An output signal is derived from subtractor-divider SUBDIV at the same frequency that signals are supplied to the subtractor-divider by memory MEMOCIRC, by inhibiting the output of the subtractor-divider with output pulses from inhibiting network BLOC that is activated once every T seconds in synchronism with activation of memory MEMOCIRC.

Figure 9:
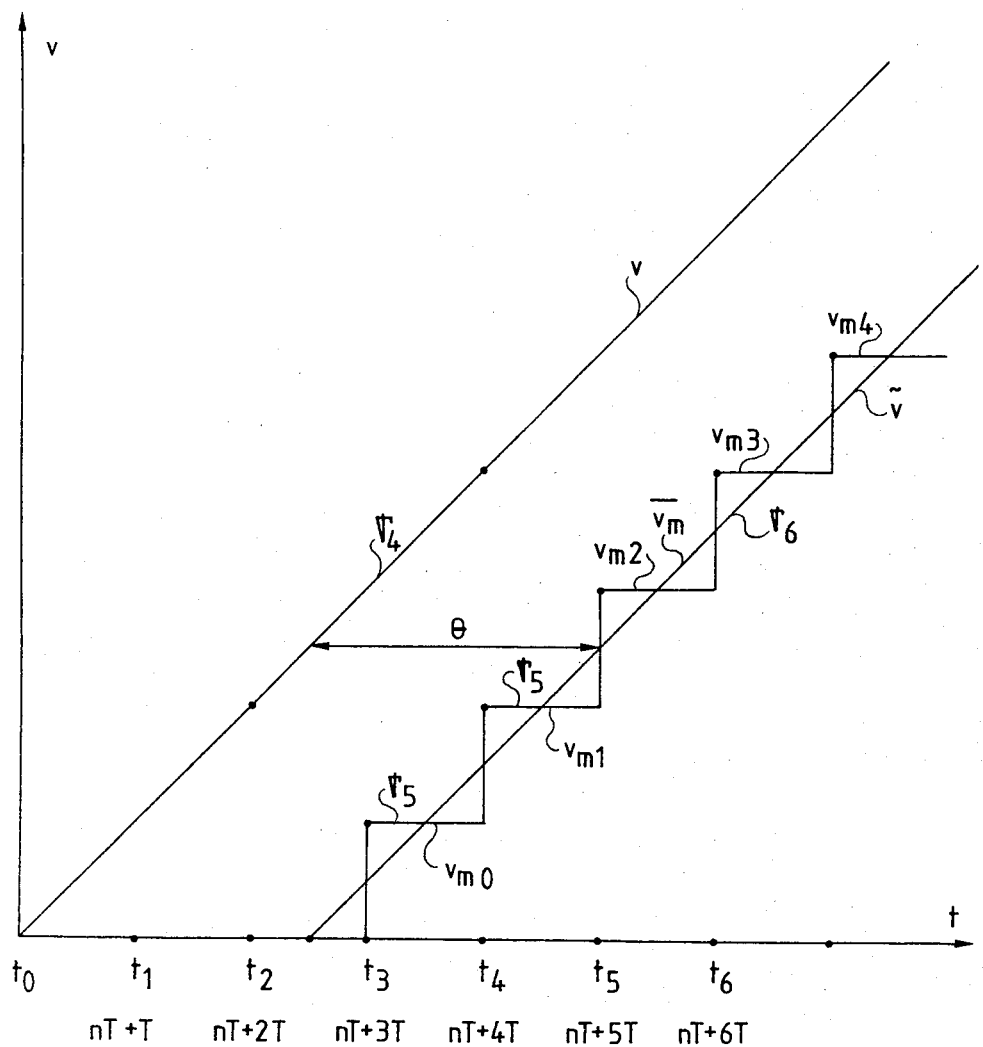
FIG. 9 is a diagram of estimated average measured speed, with an estimation delay $\theta$, with respect to actual speed of the movable system.

The average estimation delay $\theta$ is determined by relying upon the facts that the time interval separating sampling times (nT) and $(nT+k_0T)$ is a sufficiently small interval (a few milliseconds) such that the variation in the actual speed v of head TEL can be considered as a linear function. The corresponding variation in the speed of head TEL as a function of time is illustrated in FIG. 9, wherein the symbols $t_0, t_1, t_2, t_3, t_4, t_5$, etcetera, respectively designate the sampling times (nT), $(nT+T), (nT+2T), (nT+3T), (nT+4T), (nT+5T), (nT+6T)$, etcetera; it is assumed that $k_0$ equals 4. At time $t_4$, subtractor-divider SUBDIV calculates the value $v_{m1} = (ADL(nT+4T) - ADL(nT))/4T$. The calculated value of $v_{m1}$ is blocked for T seconds by inhibiting device BLOC, i.e., between times $t_4$ and $t_5$. At time $t_5$, the value $(ADL(nT+5T) - ADL(nT+T))/4T = v_{m2}$ is calculated. The calculated value of $v_{m2}$ is blocked for T seconds between times $t_5$ and $t_6$. Similarly, at time $t_6$, the speed $v_{m3}$ is calculated as $(ADL(nT+6T) - ADL(nT+2T))/4T$. The calculated value of $v_{m3}$ is blocked for T seconds between times $t_5$ and $t_6$. It is apparent that measured speed $v_m$ for times before $t_4$ and after $t_6$ is determined identically to that described for times between $t_4$ and $t_6$. The measured speed derived from network CALVIT is thus a series of steps, as represented by curve $r_5$, FIG. 9, with the average speed $v_m$ being represented by a relatively straight line $r_6$. Because of the linear evolution of actual speed v as a function of time, the measured speed $v_m$ at times $t_1, t_2, t_3, t_4, t_5$, etcetera, equals the actual speed v measured at the time $(nT + k_0T/2)$. This fact can be verified by comparing curves $r_4$ and $r_5$, FIG. 9. Thereby, the speed measured at time $t_4$ is equal to the actual speed at time $t_2$, such that $t_2 = (t_4 + t_0)/2 = t_0 + (t_4 - t_0)/2 = t_0 + k_0T/2 = t_0 + 2T$.

This correlation between measured and actual speed results from the fact that when speed evolves linearly as a function of time, the average speed between two times equals the measured speed at the middle of the time interval separating a pair of sampling times. Because the value of average speed $\bar{v}_m$ is blocked for T seconds, it is clearly seen, particularly from FIG. 9, that the average estimated delay $\theta = k_0T/2 + T/2 = (k_0+1)T/2$.

The optimum value of $k_0$ is determined from the known relationship that $v_m = 1q/k_0T$ and that the accuracy with which the quantity 1q is determined is equal to the value of q. Thereby, a quantification error $\epsilon_q$ exists in determining the measured speed $v_m$, which quantification error is equal to $q/k_0T$. To the quantification error $\epsilon_q$ is added an error $\epsilon_\theta$ due to the average estimation delay $\theta = (k_0+1)T/2$. The result is that the absolute value of $\epsilon_\theta$ is equal to the absolute value of $\gamma \cdot \theta$, whereby, in effect, $\gamma = dv/dt$, i.e., $dv = dt$. If a function Q, known as a "cost function", is defined such that $Q = \epsilon_q + \epsilon_\theta$, there exists a value $k_0 = 1/T\sqrt{2q//\gamma/}$, to minimize the cost function. It is found that $k_0 = 4$ in the described embodiment.

While there have been described and illustrated several specific embodiments of the invention, it will be clear that variations in the details of the embodiments specifically illustrated and described may be made without departing from the true spirit and scope of the invention as defined in the appended claims.

I claim:

1. A method for displacing a movable system with respect to a data carrier on which are recorded a plurality of tracks having addresses written within a plurality of reference zones, the number of reference zones being at least equal to the number of tracks, each track being associated with at least one zone, the movable system being driven by a motor and comprising at least one data read head which is displaced from a starting track to an address arrival track $ADL_f$, addresses read by the head during displacement thereof by the motor being designated by $ADL_j$, said method comprising calculating an acceleration instruction $\gamma_c$ in response to read addresses $ADL_j$ at predetermined sampling instants, measuring the acceleration $\tilde{\gamma}$ of the system, comparing the accelerations $\gamma_c$ and $\tilde{\gamma}$, and controlling the motor as a function of the comparison between $\gamma_c$ and $\gamma$.

2. The method of claim 1 further comprising reading the addresses at spaced sampling times, at each of the sampling times: calculating the separation $\epsilon_1$ between the arrival track and the address read by the head, determining a non-linear function $f(\epsilon_1)$ in response to the calculated separation $\epsilon_1$, calculating the speed v of the system as a function of the difference of the addresses read by the head at differing sampling times, and calculating the acceleration instruction $\gamma_c$ proportionately to the sum $(f(\epsilon_1)-v)$.

3. A method of shifting a head which is movable relative to a carrier for recorded information carried by a plurality of recording tracks, the addresses of the tracks being recorded on the carrier in a plurality of reference zones, at least equal in number to the number of tracks, each track being associated with at least one zone, the head being moved by a motor and reading the addresses, the head being shifted from a starting track A to a destination track B, comprising the steps of accelerating the head from track A to an intermediate track C by supplying the motor with a constant voltage, after the head has reached track C reversing the polarity of the constant voltage as a function of the actual acceleration magnitude of the head and addresses read by the head so the head is decelerated and stops at track B.

4. The method of claim 3 wherein the read addresses and the address of the destination track are combined to derive an acceleration instruction, and controlling the polarity of the constant voltage in response to the relative values of the acceleration instruction and the actual acceleration.

5. The method of claim 1 or 2 or 4 wherein the voltage supplied to the motor is controlled by calculating the difference between the read address and the address of the destination track, calculating the speed of the head in response to the time required by the head to read addresses separated from each other by a predetermined amount, and calculating the acceleration instruction as a function of the separation and the head speed.

6. Apparatus for displacing a movable system with respect to a data carrier on which are recorded a plurality of tracks having addresses written within a plurality of reference zones, the number of reference zones being at least equal to the number of tracks, each track being associated with at least one zone, the movable system being driven by a motor, and including at least one data read head which is displaced from a starting track to an address arrival track, said apparatus comprising means responsive to the read addresses derived from the head for deriving a signal indicative of an acceleration instruction $\gamma_c$, means coupled to the system for measuring the acceleration $\tilde{\gamma}$ of the system and for deriving a signal indicative of $\tilde{\gamma}$, means responsive to the signals indicative of $\gamma_c$ and $\tilde{\gamma}$ for comparing $\gamma_c$ and $\tilde{\gamma}$ and deriving an error signal, and means responsive to the error signal for controlling the motor.

7. The apparatus of claim 6 wherein the means for calculating includes means for calculating the separation $\epsilon_1$ between the arrival track address and the address read by the head and for deriving a signal indicative of the calculated separation, a non-linear function generator for deriving a signal indicative of $f(\epsilon_1)$ in response to the calculated separation signal $\epsilon_1$, means for calculating the speed v of the system and deriving a signal indicative of v in response to the read addresses as a function of the difference of the addresses read by the head at differing times, and means for calculating the acceleration instruction $\gamma_c$ proportionately to the sum $(f(\epsilon_1)-v)$ in response to the signals indicative of $f(\epsilon_1)$ and v.

8. Apparatus for shifting a head which is movable relative to a carrier for recorded information carried by a plurality of recording tracks, the addresses of the tracks being recorded on the carrier in a plurality of reference zones at least equal in number to the number of tracks, each track being associated with at least one zone, the head reading the addresses, the head being shifted from a starting track A to a destination track B, comprising means for accelerating the head from track A to an intermediate track C and for decelerating the head when it reaches track C so the head stops at track B, said means for accelerating and decelerating including means for calculating an acceleration instruction in response to addresses read by the head and for deriving a signal indicative of the acceleration instruction, means for measuring the head acceleration and for deriving a signal indicative of measured head acceleration, means responsive to the acceleration instruction and the measured head accleration signals for deriving an error signal, and means for controlling the speed of the head as a function of the error signal.

9. The apparatus of claim 8 wherein said control means includes a motor for driving the head and means for supplying the motor with a constant voltage having a polarity controlled by the relative amplitude of the acceleration instruction and the measured head acceleration.

10. In combination, a head which is movable relative to a disc for recorded information carried by plural concentric recording tracks on the disc, addresses of the tracks being recorded on the disc in a plurality of reference zones at least equal in number to the number of tracks, each track being associated with at least one zone, the head reading the recorded information and addresses, the head being shifted from a starting track A to a destination track B, an electric motor for driving said head, means for controlling the motor so the head is accelerated from track A to track C while the head is traveling from track A to track C and the head is decelerated when the head reaches track C, track C being between tracks A and B, said means for controlling including means for calculating an acceleration instruction signal for the head in response to addresses read by the head, means for measuring the acceleration of the head and for deriving a signal indicative of the measured acceleration, means responsive to the instruction and measured acceleration signals for deriving an error signal, and means responsive to the error signal for controlling the voltage supplied to the motor.

11. Apparatus for shifting a head which is movable relative to a carrier for recorded information carried by a plurality of recording tracks, the addresses of the tracks being recorded on the carrier in a plurality of reference zones at least equal in number to the number of tracks, each track being associated with at least one zone, the head being moved by a motor and reading the addresses, the head being shifted from a starting track A to a destination track B, comprising means for accelerating the head from track A to an intermediate track C and for decelerating the head when it reaches track C so the head stops at track B, said means for accelerating and decelerating including means for applying a constant amplitude voltage of one polarity to the motor while the head is being accelerated and for applying opposite polarity voltage pulses of differing polarity to the motor while the head is being decelerated, said voltage pulses having said amplitude and progressively narrower widths, except that the last two pulses have the same width.

12. The apparatus of claim 11 wherein the means for applying the voltages and voltage pulses includes means for calculating an acceleration instruction in response to addresses read by the head and for deriving a signal indicative of the acceleration instruction, means for measuring the head acceleration and for deriving a signal indicative of measured head acceleration, means responsive to the acceleration instruction and the measured head acceleration signals for deriving an error signal, and means for controlling the polarity of the voltage applied to the motor as a function of the error signal polarity.

13. In combination, a head which is movable relative to a disc for recorded information carried by plural concentric recording tracks on the disc, addresses of the tracks being recorded on the disc in a plurality of reference zones at least equal in number to the number of tracks, each track being associated with at least one zone, the head reading the recorded information and addresses, the head being shifted from a starting track A to a destination track B, an electric motor for driving said head, means for controlling the motor so the head is accelerated from track A to track C while the head is traveling from track A to track C and the head is decelerated when the head reaches track C, track C being between tracks A and B, said means for controlling including means for applying a constant amplitude voltage of one polarity to the motor while the head is being accelerated and for applying opposite polarity voltage pulses of differing polarity to the motor while the head is being decelerated, said voltage pulses having said amplitude and progressively narrower widths, except that the last two pulses have the same width.

14. The apparatus of claim 13 wherein the means for applying the voltage and voltage pulses includes means for calculating an acceleration instruction signal for the head in response to addresses read by the head, means for measuring the acceleration of the head and for deriving a signal indicative of the measured acceleration signals for deriving an error signal, and means responsive to the error signal polarity for controlling the voltage polarity applied to the motor.

15. The apparatus of claim 6 wherein the means for calculating the signal indicative of acceleration instruction comprises means responsive to binary coded signals indicative of addresses read by the head from the carrier and from a source for the address of the arrival track for calculating the address separation between the read and final track addresses and for deriving a signal indicative of the separation, means responsive to the signal indicative of the separation for generating a signal that is indicative of a non-linear function of the address separation, means responsive to the read addresses for calculating the head speed as a function of addresses read by the head and the time taken for the head to traverse between the addresses and for deriving a signal indicative of head speed, and means for combining the signals indicative of the non-linear function of the address separation and the head speed for deriving a control signal for the motor.

16. The apparatus of claim 15 further including means responsive to a parameter of the motor for deriving a signal indicative of the actual head acceleration, the signal indicative of acceleration instruction being delayed in time relative to the signal of actual head acceleration, means for delaying the actual head acceleration signal by a time interval commensurate with the delay of the acceleration instruction signal, and means responsive to the delayed actual acceleration signal and the acceleration instruction signal for controlling the motor.

17. The apparatus of claim 16 wherein the means for deriving the signal indicative of actual head acceleration includes means responsive to the current supplied to the motor for deriving an analog signal having a magnitude proportional to the current supplied to the motor for the head, the signal indicative of the acceleration instruction being a digital signal derived in response to the output of the function generator and the speed calculating means, means for converting the digital signal to an analog signal, and means for combining the converted analog signal with the analog signal derived in response to the current supplied to the motor.

18. The apparatus of claim 6 wherein the means for determining the acceleration instruction includes means responsive to addresses read from the carrier by the head and the arrival track address and responsive to the signal indicative of measured head acceleration, means for combining the signals indicative of the addresses read by the head and the arrival track addresses to form an acceleration indicating signal that is delayed relative to the measured acceleration signal, means for delaying the measured acceleration signal, means for combining the delayed measured acceleration signal with the acceleration indicating signal derived from the read and destination addresses to derive the acceleration instruction signal, and means for combining the acceleration instruction signal with the measured acceleration signal to derive a control signal for movement of the head.

19. The apparatus of claim 7 wherein the means for calculating head speed includes a recirculating memory responsive to addresses read by the head, said recirculating memory storing all address values read at predetermined sampling times during a predetermined sampling interval, a subtractor-divider circuit responsive to the addresses read from the recirculating memory during an interval commensurate with the interval while the recirculating memory is responsive to the addresses read by the head for deriving calculated values of head speed, and an inhibiting circuit for blocking the calculated values of head speed during an interval equal to the interval between a pair of adjacent sampling times.

20. The apparatus of claim 19 wherein the circuit responsive to addresses read by the head from tracks on the carrier includes a threshold circuit for transforming a series of analog pulses derived by the head into a series of binary pulses representing the read address in a first code, a converter register for transforming the address in the first code into an address in the second code, and a sampling generator for supplying sampling pulses to the converter register so that the converter register derives the converted address signal at the same times as the means for determining acceleration instructions.

21. Apparatus for controlling the movement of a head reading addresses from plural reference zones written on a data carrier, the number of reference zones being equal in number to the number of data tracks on the carrier, addresses of the tracks being written in the reference zone whereby each track is associated with at least one zone, said apparatus including a motor for driving the head, a circuit for deriving destination addresses for the head, means responsive to the actual acceleration of the head for deriving an actual acceleration signal, and means for combining the actual acceleration signal with signals indicative of the read and destination addresses for deriving a control signal for the motor to enable the motor to drive the head to the destination address.

22. The apparatus of claim 21 wherein the means for deriving the signal indicative of actual acceleration of the head includes means for monitoring the current supplied to the motor.

23. A method of shifting a head relative to a magnetic disc for recorded information carried by plural concentric recording tracks on the disc, addresses of the tracks being recorded on the disc in a plurality of reference zones at least equal in number to the number of tracks, each track being associated with at least one zone, the head reading the recorded information and addresses, the head being shifted from a starting track A to a destination track B, an electric motor for driving said head, said method comprising controlling the motor so the head is accelerated from track A to track C while the head is traveling from track A to track C and the head is decelerated when the head reaches track C, track C being between tracks A and B, calculating an acceleration instruction for the head in response to addresses read by the head, measuring the acceleration of the head, responding to the instruction and measured accelerations for deriving an indication of an error between them, and controlling the motor in response to the error indication.

* * * * *